United States Patent
Park

(10) Patent No.: US 8,051,932 B2
(45) Date of Patent: Nov. 8, 2011

(54) METHOD OF COMPENSATING FOR AUXILIARY LOADS OF HYBRID VEHICLE

(75) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 453 days.

(21) Appl. No.: 12/231,694

(22) Filed: Sep. 5, 2008

(65) Prior Publication Data

US 2009/0260903 A1    Oct. 22, 2009

(30) Foreign Application Priority Data

Apr. 21, 2008 (KR) .................. 10-2008-0036900

(51) Int. Cl.
*B60K 6/20* (2007.10)

(52) U.S. Cl. ............................. 180/65.21; 180/65.265

(58) Field of Classification Search .................. 318/442, 318/108, 109; 180/65.1, 65.25, 65.245, 65.265, 180/65.31, 65.23, 65.21, 65.29, 65.285
See application file for complete search history.

(56) References Cited

U.S. PATENT DOCUMENTS 5,492,189 A * 2/1996 Kriegler et al. ............ 180/65.23
(Continued)

FOREIGN PATENT DOCUMENTS

JP        2000-245008        9/2000
(Continued)

*Primary Examiner* — Hau Phan
(74) *Attorney, Agent, or Firm* — Edwards Angell Palmer & Dodge LLP; Peter F. Corless

(57) ABSTRACT

The present invention provides a method of compensating for auxiliary loads of a hybrid vehicle, which divides the auxiliary loads into a mechanical auxiliary load and an electrical auxiliary load and performs an appropriate auxiliary load compensation according to the kind of auxiliary loads, thus improving system efficiency as well as power performance of the vehicle.

10 Claims, 3 Drawing Sheets

U.S. PATENT DOCUMENTS

| | | | |
|---|---|---|---|
| 5,847,470 A * | 12/1998 | Mitchell | 180/65.23 |
| 6,123,642 A * | 9/2000 | Saito et al. | 477/3 |
| 6,452,286 B1 * | 9/2002 | Kubo et al. | 180/65.285 |
| 6,484,830 B1 * | 11/2002 | Gruenwald et al. | 180/65.245 |
| 6,651,759 B1 * | 11/2003 | Gruenwald et al. | 180/65.245 |
| 6,806,671 B2 * | 10/2004 | Kusaka et al. | 318/442 |
| 6,814,170 B2 * | 11/2004 | Abe et al. | 180/65.25 |
| 6,845,832 B2 * | 1/2005 | Takizawa et al. | 180/53.8 |
| 6,930,460 B2 * | 8/2005 | Ishikawa et al. | 318/442 |
| 7,004,273 B1 * | 2/2006 | Gruenwald et al. | 180/65.245 |
| 7,024,858 B2 * | 4/2006 | Gray, Jr. | 60/709 |
| 7,032,385 B2 * | 4/2006 | Gray, Jr. | 60/716 |
| 7,059,436 B2 | 6/2006 | Iwasaki et al. | |
| 7,091,627 B2 * | 8/2006 | Turner et al. | 180/65.245 |
| 7,115,066 B1 * | 10/2006 | Lee | 475/153 |
| 7,152,705 B2 * | 12/2006 | Alster et al. | 180/65.245 |
| 7,180,763 B2 * | 2/2007 | Patwardhan et al. | 363/144 |
| 7,252,165 B1 * | 8/2007 | Gruenwald et al. | 180/65.265 |
| 7,308,958 B2 * | 12/2007 | Tamor et al. | 180/65.1 |
| 7,317,259 B2 * | 1/2008 | Yamauchi | 290/40 C |
| 7,325,638 B1 * | 2/2008 | Belloso | 180/65.265 |
| 7,343,993 B2 * | 3/2008 | Dong et al. | 180/65.23 |
| 7,468,876 B2 * | 12/2008 | Sullivan | 361/93.1 |
| 7,599,778 B2 * | 10/2009 | Zak | 701/66 |
| 7,647,994 B1 * | 1/2010 | Belloso | 180/65.31 |
| 2003/0057908 A1 * | 3/2003 | Kusaka et al. | 318/442 |
| 2006/0030450 A1 * | 2/2006 | Kyle | 477/3 |
| 2006/0146726 A1 * | 7/2006 | Hrishikesh | 370/252 |
| 2008/0015760 A1 * | 1/2008 | Yamauchi | 701/67 |
| 2008/0103679 A1 * | 5/2008 | Ruiz | 701/106 |

FOREIGN PATENT DOCUMENTS

| | | |
|---|---|---|
| JP | 2002-218606 | 8/2002 |
| JP | 2007-182192 | 7/2007 |
| KR | 10-2002-0003967 | 1/2002 |
| KR | 10-2002-2227463 | 1/2002 |

* cited by examiner

METHOD OF COMPENSATING FOR AUXILIARY LOADS OF HYBRID VEHICLE

CROSS-REFERENCE TO RELATED APPLICATION

This application claims under 35 U.S.C. §119(a) the benefit of Korean Patent Application No. 10-2008-0036900 filed Apr. 21, 2008, the entire contents of which are incorporated herein by reference.

BACKGROUND (a) Technical Field

The present invention relates to methods of compensating for auxiliary loads of a hybrid vehicle. More particularly, the present invention relates to a method of improving power performance of a hybrid vehicle by compensating for mechanical and electrical auxiliary loads of the vehicle, respectively.

(b) Background Art

A hybrid vehicle, in the broad sense, can encompass a vehicle driven by efficiently combining at least two different types of power sources. In many cases, the hybrid vehicle is driven by an engine which generates a rotational force by burning fuel (for example fossil fuel such as gasoline) and an electric motor which generates a rotational force with the electric power of a battery.

The hybrid vehicle is a future vehicle that employs an electric motor as an auxiliary power source as well as an internal combustion engine to provide a reduction in exhaust gas and an improvement in fuel efficiency. To meet the demands of today's society for improved fuel efficiency and the development of a more environmentally friendly product, research into hybrid vehicles is being actively conducted.

The hybrid vehicle is driven in an electric vehicle (EV) mode, which is directed to a pure electric vehicle mode using only the power of the electric motor (driving motor), in a hybrid electric vehicle (HEV) mode, which is an auxiliary mode using the rotational force of the driving motor as an auxiliary power source with the use of the rotational force of the engine as a main power source, or in a regenerative braking (RB) mode, in which the braking energy or inertia energy of the vehicle produced by braking or during driving by inertia is recovered by power generation of the driving motor and charged in a battery.

Accordingly, since the hybrid vehicle uses the engine's mechanical energy and the battery's electrical energy simultaneously in an optimal operation range of the engine and the driving motor, and the braking energy is recovered by the driving motor, the hybrid vehicle provides improved fuel efficiency and efficient energy utilization.

Meanwhile, in order to control the torque of the hybrid vehicle, it is necessary to determine an accurate driver demand torque (or power), to which a driver's intention is reflected, based on a vehicle speed and an APS input. Moreover, an operation point determination means calculates an optimal operation point of the engine and the driving motor to perform a torque distribution control of the engine and the driving motor, thus providing an optimal operation mode, while satisfying the driver demand torque.

Thus, since the driver demand torque is satisfied with "engine torque+motor torque", a vehicle controller calculates torque command values of the engine and the driving motor based on the optimal operation point and outputs the torque commands to the engine and the driving motor so as to output torque corresponding to the torque command, respectively, and thus satisfies the driver demand torque.

Accordingly, in the hybrid vehicle, load leveling, which uses charge/discharge of the battery, is performed to drive the engine in a more efficient power mode.

In a conventional internal combustion engine vehicle, the engine should output power as much as the driver depresses an accelerator pedal, i.e., according to how much the driver demands. If the engine outputs power lower than what the driver demanded, the driver is not satisfied with the power performance. If the engine outputs power higher than what the driver demanded, the driver may feel an excessive amount of power.

In the hybrid vehicle, it is possible to increase or reduce the engine power using the motor and the battery. When the engine is operated in a low power region where the efficiency is low as the driver slightly depresses the accelerator pedal, the engine power is increased to a range where the efficiency is high and the engine power other than the power required to drive the vehicle is used to generate electricity in the driving motor, thus charging the battery with the generated electricity (battery charge by the power generation of the motor).

Moreover, when high engine power is required as the driver fully depresses the accelerator pedal, the engine power is maintained at an optimal operation condition and insufficient power is supplied by driving the motor, thus supplying power in combination with the engine and the motor (battery discharge and torque assist by the motor). Accordingly, it is possible to satisfy the power that the driver demanded and drive the vehicle under conditions where the engine efficiency is high.

The load leveling is a means of improving fuel efficiency of the hybrid vehicle, and will be described with reference to exemplary FIG. 1 below. When the driver demand torque (power) is increased to suitably exceed an optimal torque of the engine, the amount of battery discharge is increased and, when the driver demand torque is suitably reduced below the optimal torque of the engine, the amount of battery charge is increased, thus maintaining the engine torque close to an optimal state. At this time, the engine torque is determined to provide the most efficient operation within a battery charge/discharge limiting value, thus performing an appropriate torque distribution of the engine and the motor. In this case, the battery charge/discharge limiting value is determined in terms of battery management including a state of charge (SOC) of the battery.

Meanwhile, since an auxiliary load is power consumed by auxiliary equipment in the hybrid vehicle independently from the drive demand torque, it is necessary to compensate for the auxiliary load appropriately. If a mechanical auxiliary load is not compensated, the power performance is degraded, and thus the driving power is reduced by the mechanically consumed power. Moreover, if an electrical auxiliary load is not compensated, it is impossible to control the SOC of the battery, and the electrical energy corresponding to the electrical load amount is continuously consumed.

Conventionally, the auxiliary loads are compensated only by increasing the engine torque (or power) regardless of the kind of auxiliary loads. Accordingly, a simple compensation is performed without consideration of the efficiency of the hybrid system, as shown in exemplary FIG. 2, the engine torque is out of an optical operation point, and thus the system efficiency is significantly decreased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a method of compensating for auxiliary loads of a hybrid vehicle, which preferably divides the auxiliary loads into a mechanical auxiliary load and an electrical auxiliary load and suitably performs an appropriate auxiliary load compensation according to the kind of auxiliary loads, thus improving system efficiency as well as power performance of the vehicle.

In one embodiment, the present invention provides a method of compensating for auxiliary loads of a hybrid vehicle, the method characterized in that the auxiliary loads in the hybrid vehicle are suitably divided into a mechanical auxiliary load and an electrical auxiliary load to preferably perform an auxiliary load compensation, in which a control value for power control of an engine and a motor and a control value for charge/discharge control of a battery are suitably compensated based on load amounts for the divided mechanical auxiliary load and electrical auxiliary load.

In one preferred embodiment, the mechanical auxiliary load is suitably compensated by compensating a driver demand power based on the auxiliary load amount.

In another preferred embodiment, the electrical auxiliary load is compensated by suitably compensating a battery charge/discharge limiting value based on the auxiliary load amount.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

Figure 1:
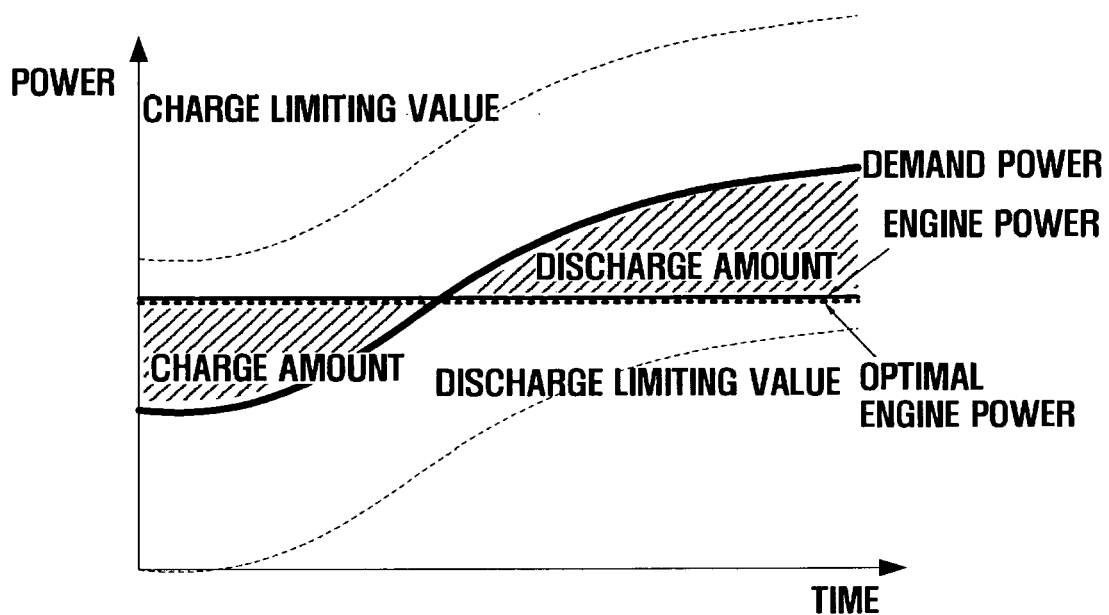
FIG. 1 is a diagram showing a battery charge/discharge state according to load leveling of a hybrid vehicle.
Figure 2:
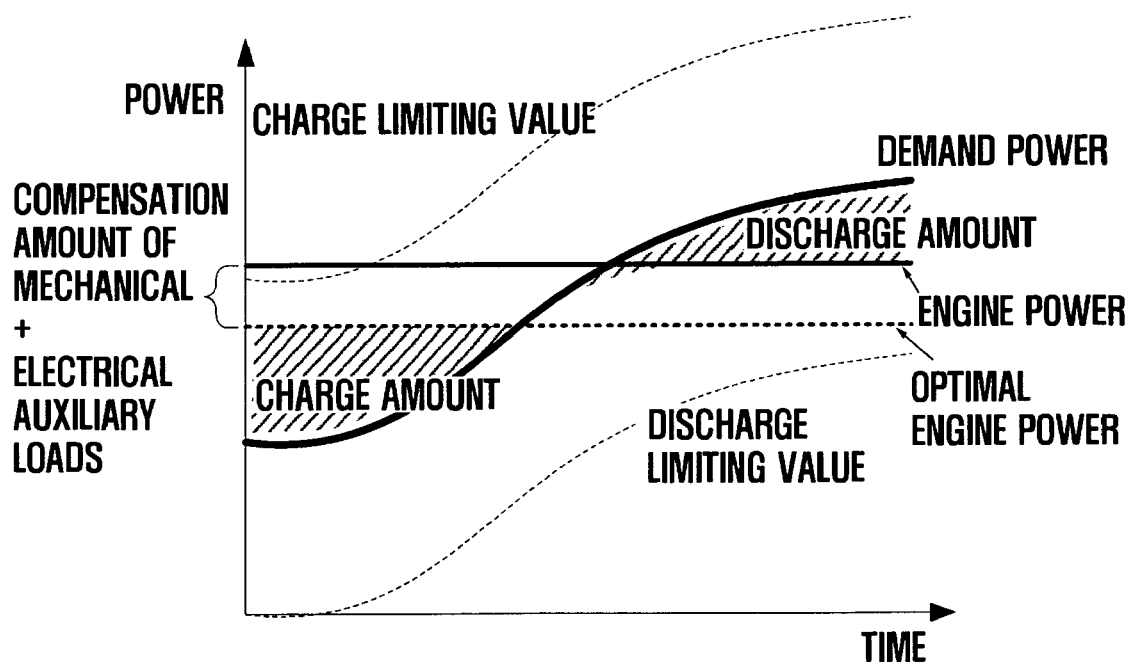
FIG. 2 is a diagram that illustrates some problems associated with conventional techniques.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method of compensating for auxiliary loads of a hybrid vehicle, the method comprising a mechanical auxiliary load and an electrical auxiliary load to perform an auxiliary load compensation. In one embodiment of the invention, the method further comprises a control value for power control of an engine and a motor and a control value for charge/discharge control of a battery. In another embodiment, the control value for power control of an engine and a motor and a control value for charge/discharge control of a battery are compensated based on load amounts for the divided mechanical auxiliary load and electrical auxiliary load. In another related embodiment, the mechanical auxiliary load is compensated by compensating a driver demand power based on the auxiliary load amount.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method of suitably compensating for auxiliary loads of a hybrid vehicle, in which an appropriate compensation method is suitably applied according to the kind of auxiliary loads to improve power performance and efficiency of a hybrid system. In preferred embodiments of the invention, the auxiliary loads are divided into mechanical and electrical loads and suitably compensated, respectively, to improve the efficiency of the hybrid system.

Figure 3:
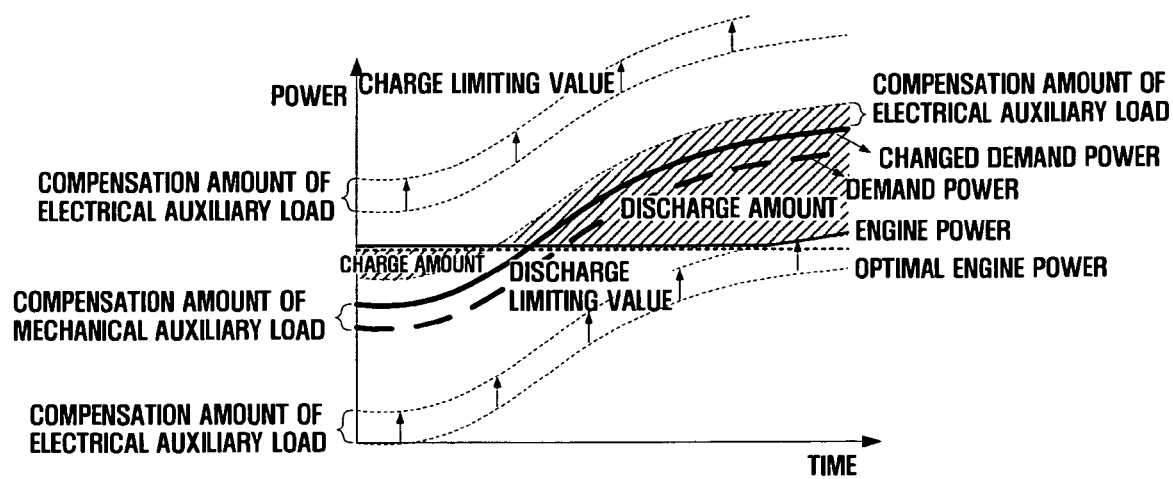
FIG. 3 is a diagram showing a method of compensating for auxiliary loads in accordance with a preferred embodiment of the present invention.

FIG. 3 is an exemplary diagram showing a method of compensating for auxiliary loads in accordance with a preferred embodiment of the present invention. In exemplary FIG. 3, a compensation state based on a change in charge/discharge limiting values and a compensation state based on an increase of a demanded power are shown.

As shown in the figure, in the present invention which suitably compensates for the auxiliary loads (mechanical and electrical auxiliary loads), the mechanical auxiliary load amount is suitably compensated by increasing the demanded power, and the electrical auxiliary load amount is suitably compensated by changing the charge/discharge limiting values, thus preferably maintaining the engine power close to the optimal operation point.

The mechanical auxiliary load and the electrical auxiliary load of the hybrid vehicle are set forth below, respectively.

Examples of the mechanical auxiliary load include, but are not limited to, an operation of an air conditioner compressor, formation of a brake booster pressure of an oil pump, and the like, which suitably use mechanical energy of the engine.

However, in case of the hybrid vehicle, since the air conditioner compressor and the oil pump are suitably driven also by electric energy of the battery (in a dual type) in consideration of an EV mode other than by the mechanical energy of the engine, the operations of the air conditioner compressor and the oil pump may be electrical auxiliary loads according to the driving mode (e.g., the EV mode).

In certain preferred embodiments, the air conditioner compressor is preferably driven by the mechanical energy of the engine, a full auto temperature controller (FATC) suitably monitors the auxiliary load amount according to the operation of the compressor and transmits load information to a hybrid control unit (HCU), and the HCU suitably utilizes the load information received from the FATC in controlling the vehicle. In further embodiments, in case of a mechanical oil pump, the auxiliary load amount may be suitably determined based on the speed and torque and, in case of an electric oil pump, since the HCU directly controls the operation thereof, in preferred embodiments the HCU may readily recognize the information on the electric auxiliary load.

Examples of the electrical auxiliary load include, but are not limited to, various electrical loads such as lamps, electric parts, a PTC heater (for vehicle heating), and the like, mounted in the vehicle. Regarding information on the electrical loads, since a low voltage DC/DC converter (LDC) controller suitably monitors the amount of electrical energy of a main battery, converted by an LDC, the HCU preferably refers to the electrical loads transmitted from the LDC controller to control the change in charge/discharge limiting values according to an increase in the electrical auxiliary load amount.

Regarding the above-described mechanical auxiliary load and the electrical auxiliary load of the hybrid vehicle, the present invention suitably employs the method of compensating for the auxiliary loads in different manners according to the kind of auxiliary loads. Accordingly, the HCU suitably monitors the use of the auxiliary loads to divide the auxiliary loads into the mechanical auxiliary load and the electrical auxiliary load, and suitably compensates for a control value for the power control of the engine and the motor and a control value for the charge/discharge control of the battery based on the load amounts for the divided mechanical auxiliary load and the electrical auxiliary load, respectively.

In preferred embodiments, the HCU monitors the mechanical auxiliary load amount and the electrical auxiliary load amount. In further embodiments, regarding the mechanical auxiliary load amount, the HCU increases the drive demand power (or torque) and calculates an optimal operation point of the engine and the driving motor so as to suitably satisfy the changed demand power. In further preferred embodiments, the HCU performs a power (or torque) distribution control for the engine and the driving motor so as to satisfy the driver demand power regardless of the auxiliary load amount and, at the same time, to suitably maintain the engine power at an optimal state.

In other preferred embodiments, regarding the electrical auxiliary load amount, the HCU suitably increases the charge limiting value and decreases the discharge limiting value according to an increase in the electrical auxiliary load. Accordingly, the amount of the battery to be used is determined in terms of battery SOC management and efficiency, and an improvement of the system efficiency is suitably obtained through the change in charge/discharge limiting values.

Referring to exemplary FIG. 3, the compensation amount for the mechanical auxiliary load and the compensation amount for the electrical auxiliary load as well as the changed demand power are shown, and it can be seen that the engine power is close to the optimal state while satisfying the driver demand regardless of the auxiliary load amounts.

Figure 4:
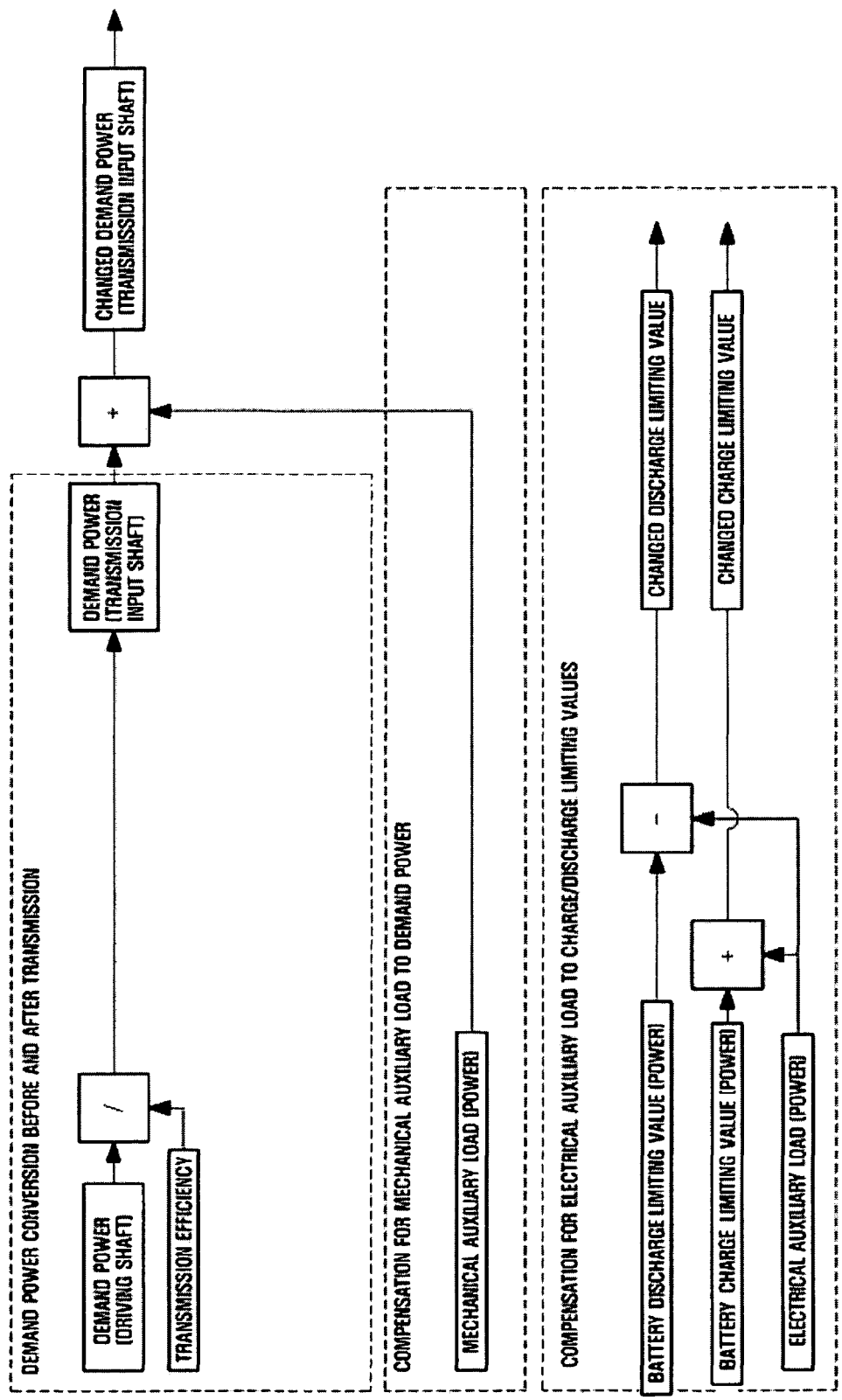
FIG. 4 is a logic diagram illustrating compensating for auxiliary loads in accordance with the present invention.

FIG. 4 is an exemplary diagram showing a logic of compensating for auxiliary loads in accordance with preferred embodiments of the present invention.

As shown in the figure, when a driver demand power (transmission input shaft) is determined through a demand power conversion process before and after the transmission, the HCU suitably compensates for the demand power, a control value for the power control of the engine and the motor, by reflecting the monitored mechanical auxiliary load (power) amount.

Accordingly, the demand power of the transmission input shaft is suitably determined from a demand power of a driving shaft based on transmission efficiency (suitably changed by conditions such as a transmission phase and oil temperature), and a changed demand torque (transmission input shaft) is suitably calculated by adding the mechanical auxiliary load (power) amount thereto. Accordingly, the mechanical auxiliary load amount is compensated by the demand power compensation in which the demand power is suitably increased by reflecting the mechanical auxiliary load amount.

The power-based control is shown in the exemplary figure, however during a torque-based control, a suitable demand torque of the transmission input shaft is determined, and a torque compensation amount calculated by dividing the mechanical auxiliary load (power) by an engine speed is added thereto to compensate for the demand torque. Accordingly, the torque control of the engine and the motor is suitably performed with the changed demand torque based on an optimal operation point.

In other certain embodiments that are different from the above-described mechanical auxiliary load amount compensation, when an electrical auxiliary load is preferably used, the HCU performs the load compensation by preferably reflecting the monitored electrical auxiliary load amount through a separate logic. At this time, the charge/discharge limiting value of the battery is suitably compensated, and thus the charge/discharge control of the battery is performed based on the changed charge/discharge limiting value.

In exemplary embodiments, when an electrical load, for example, but not limited to, lamps, electrical parts, PTC heater (for vehicle heating), and the like, suitably mounted in the vehicle, is used, the HCU receives information on the electrical auxiliary load amount (information on the amount of main battery used) according to the preferred use of the electrical load from the LDC controller and suitably changes the discharge/charge limiting values by subtracting the electrical auxiliary load (power) amount from the battery discharge limiting value (power) or by suitably adding the electrical auxiliary load (power) amount to the battery charge limiting value (power).

As described herein, in the method of compensating for auxiliary loads of the present invention, the process of dividing the auxiliary loads preferably into the mechanical auxiliary load and the electrical auxiliary load upon the use of the auxiliary loads, and the process of compensating for the auxiliary loads in an appropriate manner according to the kind of the auxiliary loads are suitably performed. As a result, it is possible to maintain the engine power suitably close to the optimal operation point and satisfy the demand power, thus improving the power performance and system efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for compensating for auxiliary loads in a hybrid vehicle, the method comprising:
   dividing, by a control unit, the auxiliary loads in the hybrid vehicle into a mechanical auxiliary load and an electrical auxiliary load to perform an auxiliary load compensation, in which a first control value for power control of an engine and a motor and a second control value for charge/discharge control of a battery are compensated based on auxiliary load amounts of the divided mechanical auxiliary load and electrical auxiliary load, respectively.

2. The method of claim 1, wherein the mechanical auxiliary load is compensated by compensating a driver demand power based on the auxiliary load amount.

3. The method of claim 2, wherein the driver demand power is increased based on the auxiliary load amount.

4. The method of claim 1, wherein the electrical auxiliary load is compensated by compensating a battery charge/discharge limiting value based on the auxiliary load amount.

5. The method of claim 4, wherein a battery charge limiting value is increased and a battery discharge limiting value is reduced based on the auxiliary load amount.

6. A system comprising:
   a control unit in a hybrid vehicle configured to monitor and divide a plurality of auxiliary loads in the hybrid vehicle into mechanical auxiliary loads and electrical auxiliary loads and perform an auxiliary load compensation, in which a first control value for power control of an engine and a motor, and a second control value for charge/discharge control of a battery, are compensated based on auxiliary load amounts of the divided mechanical auxiliary loads and electrical auxiliary loads, respectively.

7. The system of claim 6, wherein the mechanical auxiliary loads are compensated by compensating a driver demand power based on the auxiliary load amount.

8. The system of claim 7, wherein the driver demand power is increased based on the auxiliary load amount.

9. The method of claim 7, wherein the electrical auxiliary load is compensated by compensating a battery charge/discharge limiting value based on the auxiliary load amount.

10. The method of claim 9, wherein a battery charge limiting value is increased and a battery discharge limiting value is reduced based on the auxiliary load amount.

* * * * *